United States Patent
Kim et al.

(10) Patent No.: US 7,826,543 B2
(45) Date of Patent: Nov. 2, 2010

(54) MOBILE STATION IN ORTHOGONAL FREQUENCY DIVISION MULTIPLEXING ACCESS SYSTEM AND TRANSMIT POWER CONTROL METHOD THEREOF

(75) Inventors: Dae-Ho Kim, Daejeon (KR); Youn-Ok Park, Daejeon (KR)

(73) Assignees: Samsung Electronics Co., Ltd. (KR); Electronics and Telecommunications Research Institute (KR); KT Corporation (KR); SK Telecom Co., Ltd. (KR); KTFreetel Co., Ltd. (KR); Hanaro Telecom, Inc. (KR)

( * ) Notice: Subject to any disclaimer, the term of this patent is extended or adjusted under 35 U.S.C. 154(b) by 729 days.

(21) Appl. No.: 11/793,160

(22) PCT Filed: Sep. 8, 2005

(86) PCT No.: PCT/KR2005/002972

§ 371 (c)(1),
(2), (4) Date: Jun. 14, 2007

(87) PCT Pub. No.: WO2006/065020

PCT Pub. Date: Jun. 22, 2006

(65) Prior Publication Data

US 2008/0019455 A1  Jan. 24, 2008

(30) Foreign Application Priority Data

Dec. 17, 2004 (KR) .................. 10-2004-0108220

(51) Int. Cl.
*H04L 27/28* (2006.01)
*H04B 1/04* (2006.01)
(52) U.S. Cl. .................. 375/260; 375/297; 455/127.2
(58) Field of Classification Search .............. 375/260, 375/267, 297; 455/127.1–127.3
See application file for complete search history.

(56) References Cited

U.S. PATENT DOCUMENTS

| 6,240,071 B1* | 5/2001 | Willenegger et al. ........ 370/311 |
| 6,654,358 B1 | 11/2003 | Park et al. |
| 6,690,944 B1 | 2/2004 | Lee et al. |
| 6,795,426 B1 | 9/2004 | Raleigh et al. |
| 7,333,784 B2* | 2/2008 | Jin et al. .................. 455/127.2 |
| 2001/0010684 A1 | 8/2001 | Willenegger et al. |
| 2002/0145968 A1 | 10/2002 | Zhang et al. |

FOREIGN PATENT DOCUMENTS

| KR | 1020040054844 | 12/2002 |
| KR | 1020040028490 | 4/2004 |
| WO | WO 02/49305 | 6/2002 |

OTHER PUBLICATIONS

Didem Kivanc et al.; "Subcarrier Allocation and Power Control for OFDMA"; 2000 IEEE; pp. 147-151; Department of Electrical Engineering, University of Washington, Seattle, Washingtong.

* cited by examiner

*Primary Examiner*—David B Lugo
(74) *Attorney, Agent, or Firm*—The Farrell Law Firm, LLP

(57) ABSTRACT

The present invention relates to a mobile station of an OFDMA system and a transmit power control method thereof. The mobile station includes a modulator, a variable gain amplifier, a gain controller, and a power controller. The modulator modulates transmit data according to the number of allocated subchannels, and the variable gain amplifier amplifies the transmit data. The gain controller controls a gain of the transmit data inputted to the variable gain amplifier according to a subchannel gain value corresponding to the number of subchannels. The power controller calculates a power control gain for controlling power of the transmit data except the subchannel gain value based on the signal received from the base station and outputs the power control gain to the variable gain amplifier.

12 Claims, 3 Drawing Sheets

[Fig. 1]
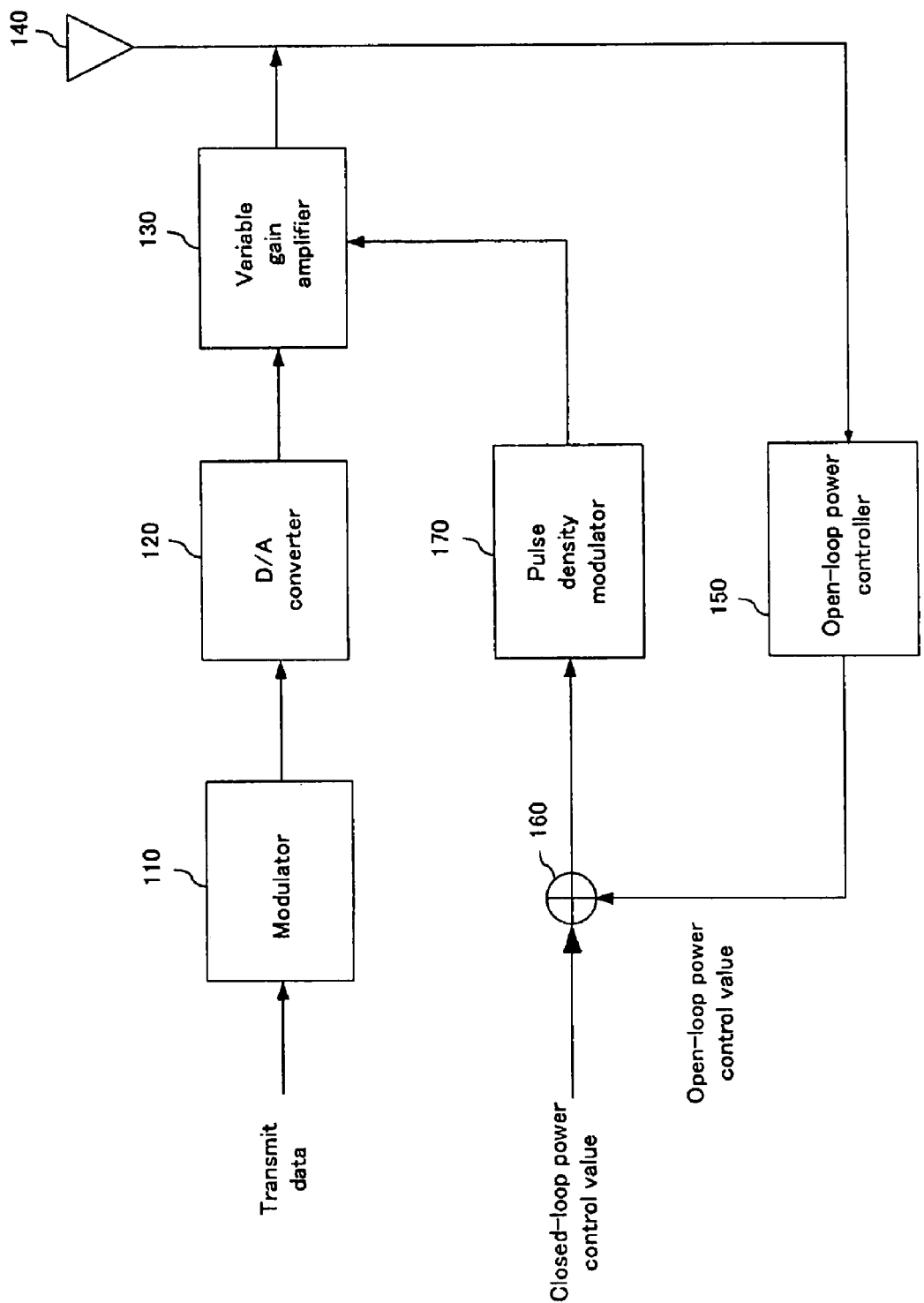

[Fig. 2]
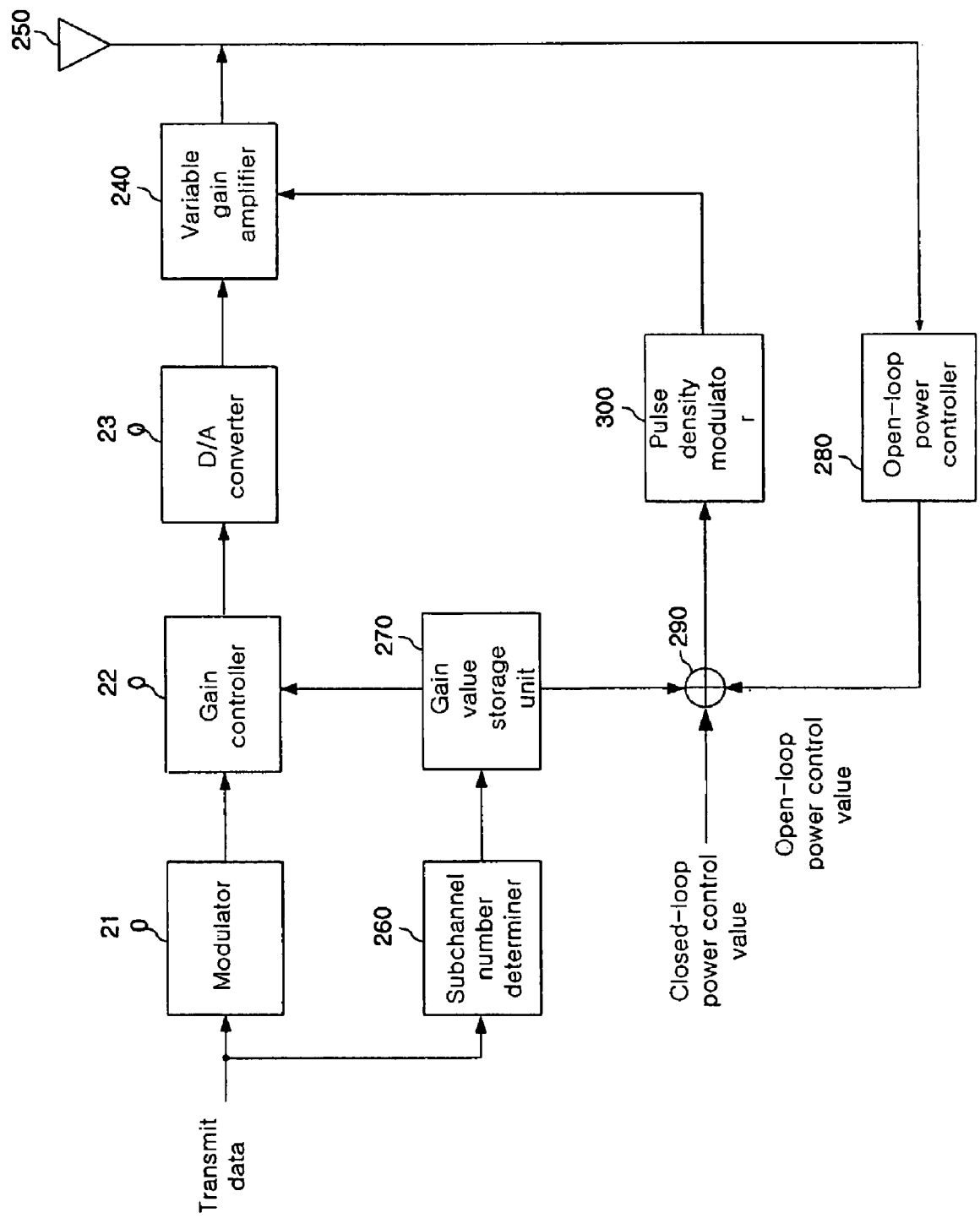

[Fig. 3]
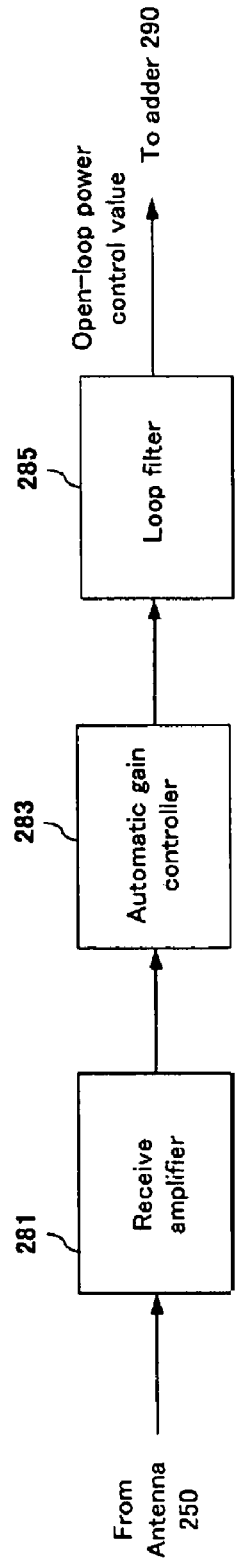

MOBILE STATION IN ORTHOGONAL FREQUENCY DIVISION MULTIPLEXING ACCESS SYSTEM AND TRANSMIT POWER CONTROL METHOD THEREOF

TECHNICAL FIELD

The present invention relates to an orthogonal frequency division multiplexing access (OFDMA) system. More particularly, the present invention relates to a mobile station device for maintaining signal-to-noise ratio (SNR) of a transmitted signal regardless of the number of subchannels, and a transmit power control method thereof.

BACKGROUND ART

Various multiple access methods based on the orthogonal frequency division multiplexing (OFDM) method have been studied as candidate methods for satisfying users who require a high-speed multimedia service for next generation mobile communication. Among those methods, an orthogonal frequency: division multiplexing access (OFDMA) method, based on the OFDM method, is for achieving multiple accesses by forming respective user data from subsets among a total of orthogonal sub-carriers. In the OFDMA, the respective subsets of the subcarriers are allocated to each mobile station, and allocated units (i.e., subsets) are called subchannels.

In an uplink of a mobile communication system, capacity for the mobile communication system is increased by minimizing interference between mobile stations, and transmit power is controlled such that a base station may receive signals from the mobile stations with constant strength for the purpose of improving communication quality.

Since received signal strength (RSS) is in inverse proportion to a distance between the base station and the mobile station in a conventional code-division multiple access (CDMA) mobile communication system or IEEE 802.11 orthogonal frequency division multiplexing (OFDM) method, signals transmitted from the mobile station may be received in the base station with constant strength by increasing the transmit power for a mobile station far from the base station and reducing the same for a mobile station close to the base station.

Methods for controlling the transmit power in the conventional OFDMA system have been disclosed in Korean Patent Publication No. 2002-0081154 "Method for control power of forward communication channel on OFDMA mobile communication system", and in the method, reliability of a communication channel may also be maximized by adaptively controlling the power of the forward communication channel according to the distance between the base station and the mobile station or varied locations of the base station and the mobile station.

In addition, amplitude of an output signal of a modulator varies according to the number of subchannels since the number of subchannels varies according to a communication environment in the OFDMA system. Accordingly, the transmit power of the mobile station may vary in the same place according to variations of the number of subchannels.

Accordingly, the transmit power of the mobile station for the uplink transmission in the OFDMA system is required to be controlled by synthetically considering the distance between the base station and the mobile station, the number of subchannels, and modulation levels. In addition, the transmit power is required to be controlled such that the signals transmitted from the mobile stations may be received in the base station with the constant-strength while a signal to noise ratio (SNR) of the transmitted signal is maintained at a predetermined level regardless of the variation of the number of subchannels.

However, in the conventional CDMA mobile communication system or IEEE 802.11 OFDM method, the amplitude of the output signal of the modulator is constant since the number of subchannels does not vary according to the communication environment. Accordingly, it has not been considered to control the transmit power according to the number of subchannels used in the OFDMA system since the SNR and the transmit output according to the variation of the number of subchannels are not reduced when controlling the uplink power.

Even in the OFDMA system, a power control algorithm has been relatively simple since the uplink transmit power control has conventionally been performed by considering the received signal strength according to the distance between the base station and the mobile station. However, the SNR and the transmit output are reduced according to the variation of the number of subchannels used in the system, and therefore an operational area of a transmit output end is required to be widened to be capable of processing the reduction.

The above information disclosed in this Background section is only for enhancement of understanding of the background of the invention, and therefore it may contain information that does not form the prior art that is already known in this country to a person of ordinary skill in the art.

DISCLOSURE OF INVENTION

Technical Problem

The present invention has been made in an effort to provide a mobile station of an orthogonal frequency division multiplexing access (OFDMA) system having advantages of preventing reduction of a signal to noise ratio by controlling a gain value of an output signal of a modulator according to the number of subchannels.

Technical Solution

An exemplary mobile station of an orthogonal frequency division multiplexing access (OFDMA) system having a variable number of subchannels according to an embodiment of the present invention includes a modulator, a variable gain amplifier, a gain controller, and a power controller. The modulator modulates transmit data according to the number of allocated subchannels and outputs the transmit data. The variable gain amplifier amplifies the transmit data outputted by the modulator and transmits the amplified transmit data to the base station through an antenna. The gain, controller controls a gain of the transmit data inputted to the variable gain amplifier according to a subchannel-gain value corresponding to the number of subchannels. The power controller generates a power control gain for controlling power of the transmit data except the subchannel gain value with reference to the signal received from the base station through the antenna, and outputs the power control gain to the variable gain amplifier.

In an exemplary method for controlling transmit power in a mobile station of an orthogonal frequency division multiplexing access (OFDMA) system having a variable number of subchannels according to communication environments according to another embodiment of the present invention, a) transmit data are modulated and outputted according to the number of allocated subchannels, b) a gain of the modulated transmit data is controlled according to a subchannel gain value corresponding to the number of the subchannels, and c) the gain-controlled transmit data are amplified according to a power control gain value generated to control power of the transmit data in b) and outputted to the base station. The power control value in c) is established by subtracting the subchannel gain value from a value obtained by adding an open-loop power control value for controlling the transmit power with reference to the distance between the base station and mobile station to a closed-loop power control value generated with reference to information on strength of a signal transmitted from the base station which receives a signal transmitted from the mobile station.

ADVANTAGEOUS EFFECTS

According to the exemplary embodiment of the present invention, the uplink power control may be performed while the SNR of the transmit signal is maintained to be constant by controlling the output value of the D/A converter to be constant by controlling the output gain value of the modulator according to the variation of the number of subchannels.

BRIEF DESCRIPTION OF THE DRAWINGS

FIG. 1 shows a block diagram of a mobile terminal for performing uplink power control in a CDMA mobile communication system.

FIG. 2 shows a block diagram of a mobile station of an OFDMA system according to an exemplary embodiment of the present invention.

FIG. 3 shows a detailed block diagram of an open-loop power controller shown in FIG. 2.

BEST MODE FOR CARRYING OUT THE INVENTION

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A mobile station of an orthogonal frequency division multiplexing access system (OFDMA) according to an exemplary embodiment of the present invention will be described with reference to the figures.

FIG. 1 shows a block diagram of a mobile station for performing uplink power control in a code division multiple access (CDMA) mobile communication system.

As shown in FIG. 1, in a mobile station of a code division multiple access (CDMA) mobile communication system, a modulator 110 modulates data to be transmitted to a base station, a digital/analog (D/A) converter 120 converts the modulated data into an analog signal, a variable gain amplifier 130 amplifies a gain of the converted analog signal, and an antenna 140 transmits the signal to the base station.

The mobile station may control transmit power transmitted to the base station by controlling the gain of the signal amplified by the variable gain amplifier 130 with reference to power control values obtained by performing open-loop power control and closed-loop power control for the received signal strength (RSS) received from the base station by the antenna 140. An open-loop power control value is obtained by controlling the signal received through the antenna 140 by an open-loop power controller 150, and the transmit power is generated to be less in a mobile station close to the base station and to be greater in a mobile station far from the base station. In addition, a closed-loop power control value is generated for controlling an output of the signal transmitted to the base station to be constant after the mobile station receives information on the RSS since the information on the RSS is periodically transmitted from the base station receiving the signal transmitted from the mobile station.

The open-loop power control value and the closed-loop power control value are added to each other by an adder 160, modulated into a signal having a pulse density corresponding to the added value by a pulse density modulator 170, and inputted as a signal for controlling an amplification gain of the variable gain amplifier 130.

As described above, the mobile station controls the transmit power transmitted to the base station to be constant as shown in Math Figure 1.

$$\text{Mean\_Tx\_Power}(dBm) = -\text{Mean\_Rx\_Power}(dBm) \\ -\text{Power\_offset} \\ +\text{Closed Loop Power Control} \\ \text{Correction (dB)},$$ MathFigure 1 where Power_offset denotes a constant for allowing the mobile station to use a maximum transmit output when the received signal strength of the mobile station is the minimum, and it is obtained as −Min_sensitivity−Max_Tx_power.

In [Math Figure 1], the (−) sign of Mean_Rx_Power represents the open-loop power control value for increasing the transmit power when the receive power is weak and reducing the transmit power when the receive power is strong. The closed-loop power control value compensates errors caused by a difference between uplink and downlink channel characteristics in mobile communication channels.

As described, since the SNR and the transmit output according to the variation of the number of subchannels are not reduced in the CDMA mobile communication system and IEEE 802.11 orthogonal frequency division multiplexing (OFDM) method, the power control is performed by considering the RSS according to the distance between the base station and the mobile station as shown in Math Figure 1. Therefore, the power control algorithm is simplified.

However, amplitude of an output signal of a modulator varies according to the number of used subchannels since the number of subchannels varies according to the communication environment in the OFDMA system. Accordingly, various problems may be caused when the power control shown in Math Figure 1 is performed since the transmit power may vary according to the number of used subchannels in the same place.

To solve the problems, the transmit power is controlled as shown in Math Figure 2 so as to control the transmit power to be constant regardless of the variation of the number of the subchannels in the OFDMA system.

$$\text{Mean\_Tx\_Power}(dBm) = -\text{Mean\_Rx\_Power}(dBm)$$
$$-\text{Power\_offset}$$
$$+\text{No\_SCH\_Correction (dB)}$$
$$+\text{Closed Loop Power Control}$$
$$\text{Correction (dB)}$$

MathFigure 2 where Power_offset denotes a constant for allowing the mobile station to use a maximum transmit output when the RSS of the mobile station is the minimum, it is obtained as −Min_sensitivity−Max_Tx_power, and No_SCH_Correction denotes an increment of the transmit output according to the variation of the number of subchannels.

As described, the uplink power control of the OFDMA system may be performed without any problem when the variable gain amplifier 130 controls the output of the transmit signal with the gain obtained by using Math Figure 2 in order to control the uplink power according to the variation of the number of subchannels.

However, since the amplitude of the output signal of the modulator is reduced when the number of used subchannels is reduced, in a process for converting the output of the modulator 110 into an analog signal by using the D/A converter 120, problems arise in that the SNR is reduced and an operational range of the variable gain amplifier 130 is required to be increased so as to use a value obtained by adding the compensation value according to the distance between the base station and the mobile station to the compensation value according to the variation of the number of subchannels.

Accordingly, to solve the problems, the gain value of the output signal of the modulator according to the variation of the number of subchannels is directly controlled in the mobile station of the OFDMA system according to the exemplary embodiment of the present invention, and the transmit power is controlled by eliminating the above controlled gain value from the gain value applied to the variable gain amplifier.

FIG. 2 shows a block diagram of a mobile station of an OFDMA system according to an exemplary embodiment of the present invention.

As shown in FIG. 2, the mobile station of the OFDMA system according to the exemplary embodiment of the present invention includes a modulator 210, a gain controller 220, a D/A converter 230, a variable gain amplifier 240, an antenna 250, a subchannel number determiner 260, a gain value storage unit 270, an open-loop power controller 280, an adder 290, and a pulse density modulator 300.

The modulator 210 modulates transmit data with reference to the number of subchannels allocated to the data to be transmitted to the base station.

The gain controller 220 controls a gain of a signal outputted from the modulator 210 such that amplitude of the signal may be constant. The gain control is performed by a gain value outputted from the gain value storage unit 270, which will be described later. Accordingly, the amplitude of the signal outputted from the gain controller 220 is constant regardless of the number of subchannels allocated to the signal.

The D/A converter 230 converts the signal from the gain controller into an analog signal. At this time, since the amplitude of the signal from gain controller 220 is maintained to be constant, the SNR and amplitude of the signal from the D/A converter 230 are also maintained to be constant.

The variable gain amplifier 240 amplifies the signal from the D/A converter 230 and outputs the signal to the base station through the antenna 250. At this time, the variable gain amplifier 240 may control a gain value of the signal amplification, and the gain value is outputted from the pulse density modulator 300.

The subchannel number determiner 260 determines the number of subchannels allocated to the transmit data.

The gain value storage unit 270 stores gain-values corresponding to the numbers of the subchannels, finds a gain value corresponding to the number of subchannels outputted from the subchannel number determiner 260, and outputs the gain value to the gain controller 220. The gain value stored in the gain value storage unit 270 is differently established according to the number of subchannels such that the amplitude of the signal from the modulator to the D/A converter 230 may be maintained to be constant regardless of the number of subchannels.

The open-loop power controller 280 generates a control value for controlling open-loop-power of a signal to be transmitted to the base station according to the amplitude of the signal received from the base station by the antenna 250.

The adder 290 outputs a value obtained by subtracting the gain value outputted by the gain value storage unit 270 from another value obtained by adding the open-loop power control value generated by the open-loop power controller 280 to a closed-loop power control value calculated by another module. That is, since the gain value determined by the gain value storage unit 270 is applied to the signal to be transmitted, the gain value to be applied to the variable gain amplifier 240 is required to be eliminated.

The pulse density modulator 300 modulates a signal having a pulse density corresponding to the power control value outputted by the adder 290 and outputs the modulated signal to the variable gain amplifier 240. Accordingly, the variable gain amplifier 240 amplifies the signal outputted from the D/A converter 230 according to the open-loop power control value and the closed-loop power control value except the gain value determined by the number of subchannels, and transmits the signal to the base station.

FIG. 3 shows a detailed block diagram of an open-loop power controller shown in FIG. 2.

As shown in FIG. 3, the open-loop power controller 280 includes a receive amplifier, an automatic gain controller, and a loop filter.

The receive amplifier 281 amplifies the signal received by the antenna 250 and outputs the signal.

The automatic gain controller 283 automatically controls and outputs a gain compensated for the open-loop power control according to the amplitude of the received signal outputted from the receive amplifier 281.

The loop filter 285 performs a loop filtering operation on the gain value outputted from the automatic gain controller 283, and outputs the gain value to the adder 290.

An operation of the transmit power control in the mobile station of the OFDMA system according to the exemplary embodiment of the present invention will now be described.

The number of subchannels to which carriers are allocated is predetermined for the transmit data to be transmitted to the base station by the mobile station of the OFDMA system according to the exemplary embodiment of the present invention. For example, a large number of subchannels may be used in a good communication environment, and it is determined to use a small number of subchannels by reducing the number of subchannels when the communication environment is deteriorated.

As described, the transmit data for which the number of subchannels is pre-determined are modulated by the modulator 210 according to a predetermined modulation method, and transmitted. The data modulated by the modulator 210 vary according to the number of subchannels allocated to the transmit data. For example, the amplitude of the data outputted by the modulator 210 is reduced when the number of subchannels is reduced.

As described, since the amplitude of the signal outputted by the modulator 210 varies according to the number of subchannels, the gain according to the number of subchannels is required to be controlled, so as to maintain the signal amplitude to be constant. To maintain the signal amplitude to be constant, the subchannel number determiner 260 receives the transmit data and determines the number of subchannels allocated to the transmit data, and the gain value storage unit 270 detects a gain value corresponding to the number of subchannels determined by the subchannel number determiner 260 and outputs the gain value to the gain controller 220. The gain value is predetermined as a value for compensating the amplitude of the signal outputted by the modulator 210 and is varied according to the number of subchannels.

Accordingly, the gain controller 220 controls the gain of data outputted by the modulator 210 according to the gain value outputted by the gain value storage unit 270, and outputs the gain to the D/A: converter 230. Accordingly, the amplitude of the data outputted from the modulator and inputted to the D/A converter by the gain controller 220 is maintained to be constant.

The D/A converter 230 converts the data of which the gain is controlled by the gain controller into an analog signal, and outputs the analog signal to the variable gain amplifier 240. At this time, the SNR of the analog signal converted by the D/A converter 230 is also maintained to be constant and then the analog signal is outputted to the variable gain amplifier 240 since the amplitude of the signal inputted to the D/A converter 230 is maintained to be constant.

As described, the SNR of the transmit signal is not reduced when the number of subchannels allocated to the transmit data is reduced since the gain controller 220 controls the gain of the signal outputted by the modulator 210 according to the variation of the number of subchannels.

A process for generating the gain value inputted to the variable gain amplifier 240 to control the power of the transmit signal by controlling the amplification gain of the received signal by the variable gain amplifier 240 will now be described.

The receive amplifier 281 amplifies the signal received through the antenna 250. The automatic gain controller 283 generates a signal for automatically controlling the gain value for performing the open-loop power control on the data to be transmitted to the base station according to the received signal strength, and the loop filter 285 loop-filters the signal and outputs the signal to the adder 290.

In this process, the open-loop power control value is generated and inputted to the adder 290, and the closed-loop power control value is generated with reference to information on the strength of the received signal from the base station, inputted to the adder 290, and added to the open-loop power control value. Since a subchannel gain value for controlling the gain of the output data of the modulator according to the variation of the number of subchannels has already been applied to the transmit data by the gain controller 220, the adder 290 generates a final power control gain value by subtracting the subchannel gain value outputted by the gain controller 220 from a sum of the open-loop power control value and the closed-loop power control value, and outputs the final power control gain value.

The power control gain value generated by the adder 290 is modulated into corresponding pulse density by the pulse density modulator 300, and inputted as a value for controlling the amplification gain of the variable gain amplifier 240.

The variable gain amplifier 240 amplifies the analog signal outputted from the D/A converter 230 and outputs the signal to the antenna 250. At this time, the variable gain amplifier 240 amplifies the input signal according to the power control gain value outputted by the pulse density modulator 300. Accordingly, the variable gain amplifier 240 amplifies the signal by the gain value except the subchannel gain value according to the variation of the number of subchannels applied in the gain controller 220.

As described, since the gain value according to the variation of the number of subchannels has been already applied to the output data of the modulator 210 and the variable gain amplifier 240 uses the gain according to the distance between the base station and the mobile station, the uplink power control may be performed without increasing the operational range of the variable gain amplifier 240.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invetion claimed is:

1. A mobile station of an orthogonal frequency division multiplexing access (OFDMA) system having a variable number of subchannels according to communication environments, the mobile station comprising:
   a modulator for modulating transmit data according to the number of allocated subchannels and outputting the transmit data;
   a variable gain amplifier for amplifying the transmit data outputted by the modulator and transmitting the amplified transmit data to a base station through an antenna;
   a gain controller for controlling a gain of the transmit data inputted to the variable gain amplifier from the modulator according to a subchannel gain value corresponding to the number of subchannels (the subchannel gain value being predetermined according to the number of subchannels so as to maintain an output value inputted to the variable gain amplifier from the modulator to be constant); and
   a power controller for generating a power control gain for controlling power of the transmit data except the subchannel gain value with reference to the signal received from the base station through the antenna, and outputting the power control gain to the variable gain amplifier.

2. The mobile station of claim 1, wherein the gain controller comprises:
   a subchannel number determiner for determining the number of subchannels allocated to the transmit data; and
   a gain value storage unit for storing a subchannel gain value corresponding to the number of subchannels determined by the subchannel number determiner.

3. The mobile station of claim 1, further comprising
   a D/A converter for converting data outputted by the gain controller into an analog signal and outputting the analog signal to the variable gain amplifier.

4. The mobile station of claim 1, wherein the power controller comprises:
   an open-loop power controller for generating and outputting an open-loop power control value for controlling open-loop power of a signal to be transmitted to the base station according to strength of the signal received by the antenna;

an adder for calculating a value by subtracting the subchannel gain value from another value obtained by adding the open-loop power control value to a predetermined closed-loop power control value, and outputting the value as a final power control value; and a pulse density modulator for modulating a signal having a pulse density corresponding to the power control value outputted by the adder, and outputting the modulated signal to the variable gain amplifier.

5. The mobile station of claim 4, wherein the open-loop power controller comprises:

a receive amplifier for amplifying and outputting the signal received through the antenna;

an automatic gain controller for automatically controlling and outputting a control value compensated for the open-loop power control according to the strength of the received signal outputted from the receive amplifier; and a loop filter for performing a loop-filtering operation on the control value outputted by the automatic gain controller and outputting the control value to the adder.

6. The mobile station of claim 4, wherein the closed-loop power control value is generated as a value for controlling the output of the signal transmitted to the mobile station to be constant with reference to information on the strength of the received signal transmitted from the base station receiving the signal transmitted from the mobile station.

7. The mobile station of claim 4, wherein the power control gain value inputted to the variable gain amplifier has a value for allowing the mobile station to use a maximum transmit output when the receive signal strength of the mobile station is a minimum.

8. A method for controlling transmit power in a mobile station of an orthogonal frequency division multiplexing access (OFDMA) system having a variable number of subchannels according to communication environments, the method comprising:

a) modulating and outputting transmit data according to the number of allocated subchannels;

b) controlling a gain of the modulated transmit data according to a subchannel gain value corresponding to the number of the subchannels (the subchannel gain value being predetermined according to the number of subchannels so as to maintain an output value inputted to the variable gain amplifier to be constant); and c) amplifying the gain controlled transmit data according to a power control gain value generated to control power of the transmit data in b) and outputting the transmit data to a base station, wherein the subchannel gain value used for controlling the gain of the transmit data in b) is excepted from the power control gain value used in c).

9. The method of claim 8, wherein the power control gain value in c) is established by subtracting the subchannel gain value from a value obtained by adding an open-loop power control value for controlling the transmit power with reference to a distance between the base station and mobile station to a closed-loop power control value generated with reference to information on the strength of a received signal transmitted from the base station which receives a signal transmitted from the mobile station.

10. The mobile station of claim 7, wherein the power control gain value inputted to the variable gain amplifier has an increment of the transmit output according to the variation of the number of subchannel.

11. The method of claim 9, wherein the power control gain value in c) is established by subtracting a value for allowing the mobile station to use a maximum transmit output when the receive signal strength of the mobile station is the minimum from the power control gain value.

12. The method of claim 11, wherein the power control gain value in c) is established by adding an increment of the transmit output according to the variation of the number of subchannel to the power control gain value.

* * * * *